United States Patent [19]

Olges

[11] 4,088,017
[45] May 9, 1978

[54] CLOTHES DRYER AIR FLOW TEST DEVICE AND METHOD

[75] Inventor: Laurence T. Olges, Louisville, Ky.

[73] Assignee: General Electric Company, Louisville, Ky.

[21] Appl. No.: 771,538

[22] Filed: Feb. 23, 1977

[51] Int. Cl.² ............................................. G01M 19/00
[52] U.S. Cl. ..................................................... 73/168
[58] Field of Search ............. 73/168, 198, 229, 231 R, 73/231 M

[56] References Cited

U.S. PATENT DOCUMENTS

| | | |
|---|---|---|
| 3,287,973 | 11/1966 | Liebermann et al. .................. 73/198 |
| 3,548,656 | 12/1970 | Guarino .................................. 73/229 |
| 3,823,611 | 7/1974 | Rudow et al. ...................... 73/231 R |

*Primary Examiner*—Anthony V. Ciarlante

*Attorney, Agent, or Firm*—Frederick P. Weidner; Francis H. Boos

[57] ABSTRACT

A device and method for checking the adequacy of the rate of air flow in a rotating clothes dryer drum having air flow passing through perforations in the rear wall of the drum into the interior of the drum. The device comprises a rotatable fan and a counter assembly arranged to register the number of revolutions of the fan. There is provided a structure for removably attaching the device to the rear wall of the drum over at least some of the perforations in the rear drum wall. With this device and method the rate of air flow to the clothes dryer drum may be tested by operating the clothes dryer and registering the number of revolutions made by the fan for a period of time and comparing that number to a number determined previously to be an adequate air flow rate.

11 Claims, 3 Drawing Figures

CLOTHES DRYER AIR FLOW TEST DEVICE AND METHOD

BACKGROUND OF THE INVENTION

1. Field of the Invention:

This invention relates generally to automatic clothes dryers and more particularly to a device and method for testing the air flow characteristics in automatic clothes dryers.

2. Description of the Prior Art:

Most automatic clothes dryers now utilize a drum rotatable about a substantially horizontal axis in which clothes to be dried are placed. During operation of the clothes dryer air is heated either electrically or by gas and passed through the drum while the drum is being rotated to tumble the clothes and effect drying thereof. The heated air passing through the drum is subsequently expelled outside the machine and usually the machine is vented through a wall to the outdoor atmosphere. If the air flow of an automatic clothes dryer is reduced to the extent that the flow rate cannot carry the water out of the dryer as fast as the heat source is capable of evaporating the water, then the drying process will be slowed and the drum temperature elevated to a point that drying efficiency will be reduced. Because of the detrimental effects of insufficient air flow through the drum it is highly desirable to have a means of measuring the air flow rate while the drum is rotating and compare it to a chart indicating what the correct air flow should be. By testing the air flow through the drum it may be determined whether or not there are problems with the sealing of the drum, if the blower is able to produce an adequate flow of air, and whether the duct work is sufficient to handle the correct rate of air flow.

It is desirable that a device and method for testing the air flow characteristics of a clothes dryer be one that may be easily used and will function while the machine is in operation and the drum rotating. Such a device and method for testing the air flow through a clothes dryer is particularly advantageous in connection with making field tests as a result of a service call due to malfunction of the clothes dryer.

By my invention there is provided a device and method for testing the rate of air flow throgh an automatic clothes dryer drum while it is rotating which device and method is simple, and easy to use.

SUMMARY OF THE INVENTION

There is provided a device and method for checking the rate of air flow in a rotating clothes dryer drum having air flow passing through perforations in the rear wall of the drum into the interior of the drum. The device comprises a rotatable fan and a counter assembly arranged and including means to register the number of revolutions of the fan. There is also provided means to removably attach the device to the rear wall of the drum over at least some of the perforations in the rear drum wall. With this device the rate of air flow through the clothes dryer drum may be determined by operating the clothes dryer and registering the number of revolutions made by the fan for a period of time and comparing that number to a number determined previously to be an adequate air flow rate.

DESCRIPTION OF THE PREFERRED EMBODIMENT

Figure 1:
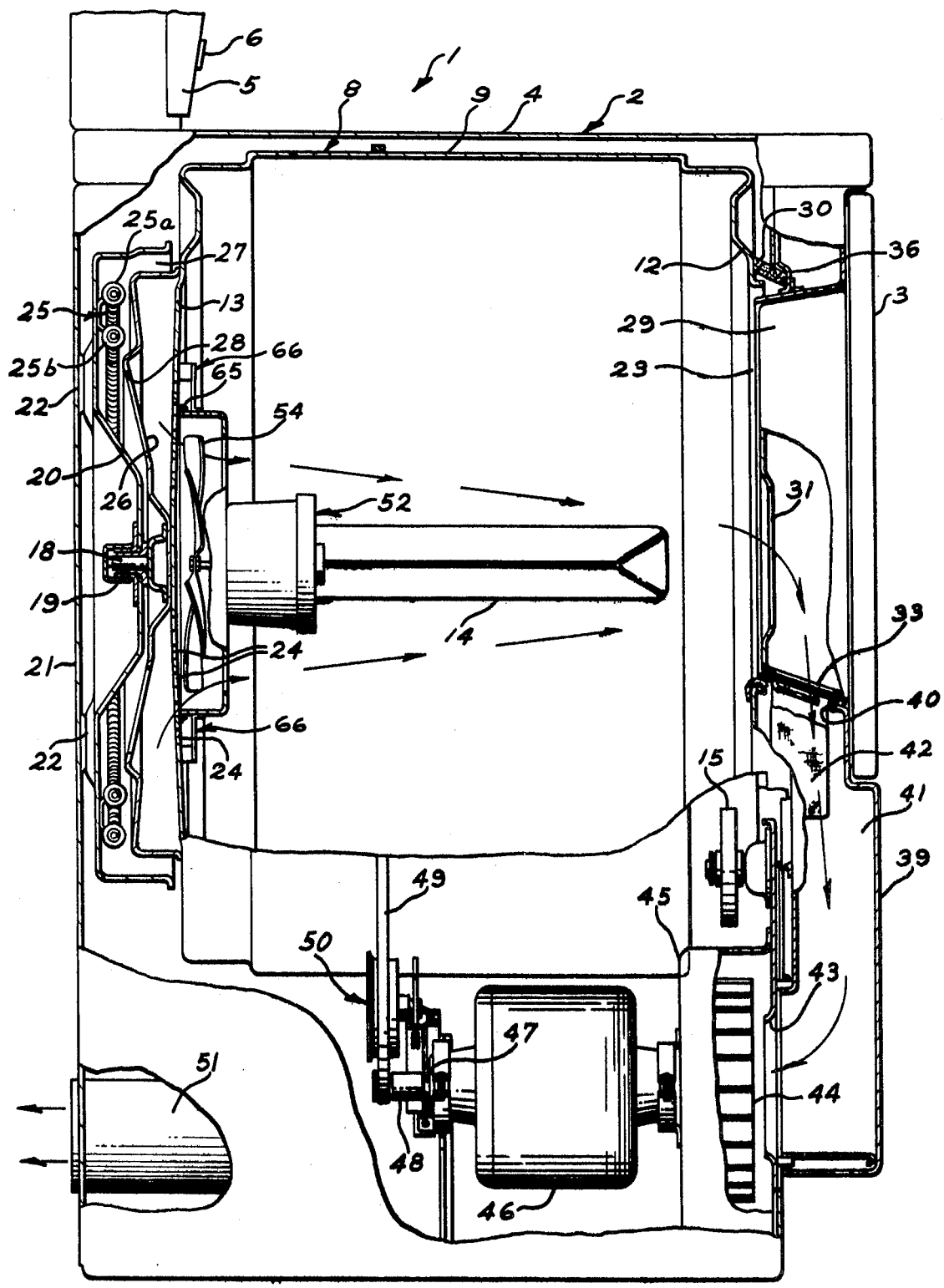
FIG. 1 is a side elevational view of an automatic clothes dryer incorporating the air flow test device of the present invention, the view being partly broken away and partly in section to illustrate details.

Referring now to FIG. 1, the machine illustrated is a domestic clothes dryer generally indicated by the numeral 1. Dryer 1 is provided, in the usual way, with a cabinet 2 having a front door 3 to provide access to the interior of the cabinet. Provided on the top wall 4 of the cabinet 2 is a control panel 5 which may include a suitable manual control 6. By manual manipulation of control 6 the machine can be caused to start and automatically proceed through a cycle of operation.

Within cabinet 2 there is provided a fabric tumbling chamber, or drum 8, mounted for rotation on a substantially horizontal axis. Drum 8 is generally cylindrical in shape having a first, outer imperforate cylindrical wall portion 9, a front wall 12 and a back wall 13. A plurality of clothes tumbling ribs 14 are provided on the interior of wall portion 9 to lift fabrics as the drum rotates, and then allow them to tumble back to the bottom of the drum.

The front of drum 8 is rotatably supported within the cabinet 2 by suitable fixed support means such as the roller shown at 15. These rollers 15 are arranged to provide a support for the front of the drum. The rear end of drum 8 receives support by means of a stub shaft 18 extending from the center of wall 13. Shaft 18 is secured within a bearing 19 supported by a baffle 20 which, in turn, is rigidly secured to the back wall 21 of cabinet 2 by any suitable means such as welding at a number of points 22. With this arrangement, the drum rotates about a horizontal axis with rollers 15 providing the front support and stub shaft 18 within bearing 19 providing the rear support.

In order to provide for the flow of a stream of drying air through the clothes dryer (as shown by arrows in FIG. 1), the drum is provided with a central aperture or loading opening 23 in its front wall 12 and with an opening in the form of a plurality of perforations 24 in its rear wall 13. Baffle member 20 also supports heating means 25, which includes two electrical resistance heating elements 25a and 25b, appropriately insulated from the baffle. A second baffle member 26 is secured to the back wall 13 of the drum outside the ring of perforations 24 and within the stationary baffle 20, so that an annular air inlet 27 is, in effect, formed by baffles 20 and 26. In this manner a passage is formed for air to enter the annular inlet opening 27 between the baffles, pass over the heating means 25, pass through openings 28 formed in baffle 26, and through the perforations 24 in rear wall 13 to the interior of the drum 8.

The front opening 23 of the drum is substantially closed by means of a bulkhead generally indicated by the numeral 29 and is formed as part of the inner surface of access door 3. The bulkhead 29 has an inlet opening 31 and an outlet opening 33, so that air may enter and leave the bulkhead 29. A suitable clearance is provided between the inner edge of the drum opening 23 and the edge of bulkhead 29 so that there will be no rubbing between the drum and bulkhead during rotation of the drum 8. There is a felt seal 30 around the front opening 23 and secured to a rigid stationary structure 36 such that it rubs the front wall 12 of the drum 8 as the drum rotates. This felt seal 30 is to prevent air leakage from the drum.

Front opening 23 also serves in addition to allowing air to flow out the front, as a means whereby clothes may be loaded into and unloaded from the drum. Door 3 is mounted on cabinet 2 so that when the door is open, clothes may be inserted into or removed from the drum 8.

The bottom wall section of the cabinet 2 has an opening 40 that provides the entrance to a duct 41. A lint trap 42 is positioned in the duct 41 at the opening 40, the trap being supported by the cabinet front wall 39.

Duct 41 leads downwardly to an opening 43. Opening 43 constitutes the inlet to a blower member 44 contained within a housing 45 and directly driven by an electric motor 46. The blower brings air over the heater means 25, through the drum 8, through the door bulkhead 29, the lint trap 42, duct 41, and then into the blower. From the blower 44 the air passes through an appropriate duct 51 out of cabinet 2 so as to be exhausted from the machine. In most clothes dryer installations there is a duct extension (not shown) attached to duct 51 for exhausting the air through a wall to the outdoors atmosphere.

In addition to driving blower 44, motor 46 constitutes the moving means for rotating the drum to tumble fabrics. To effect this rotation, motor 46 is provided with a shaft 47 having a small pulley 48 formed or secured at the end thereof. A belt 49 extends around the pulley and completely around the cylindrical wall 9 of the drum 8. The relative circumferences of pulley 48 and wall section 9 cause the drum to be driven at a speed suitable to effect tumbling of the fabrics within the drum. A suitable idler assembly 50 provides proper tensioning of the belt 49. Thus, operation of the motor both causes the fabrics to be tumbled within the drum and air to be forced through the drum. When the air is heated by heating elements 25a and 25b, the heated air passing through the drum causes vaporization of the moisture from the fabrics and the vapor is carried off with the air as it passes out of the machine.

By my invention, there is provided a device 52 for checking the rate of air flow through the drum 8. The air flow test device 52 is arranged to be attached to the rear wall 13 of the drum 8 and is generally located in the center thereof, as shown in FIG. 1. The back or rear wall 13 has a number of perforations 24 therethrough to allow the heated air to enter the drum as described heretofore.

Figure 2:
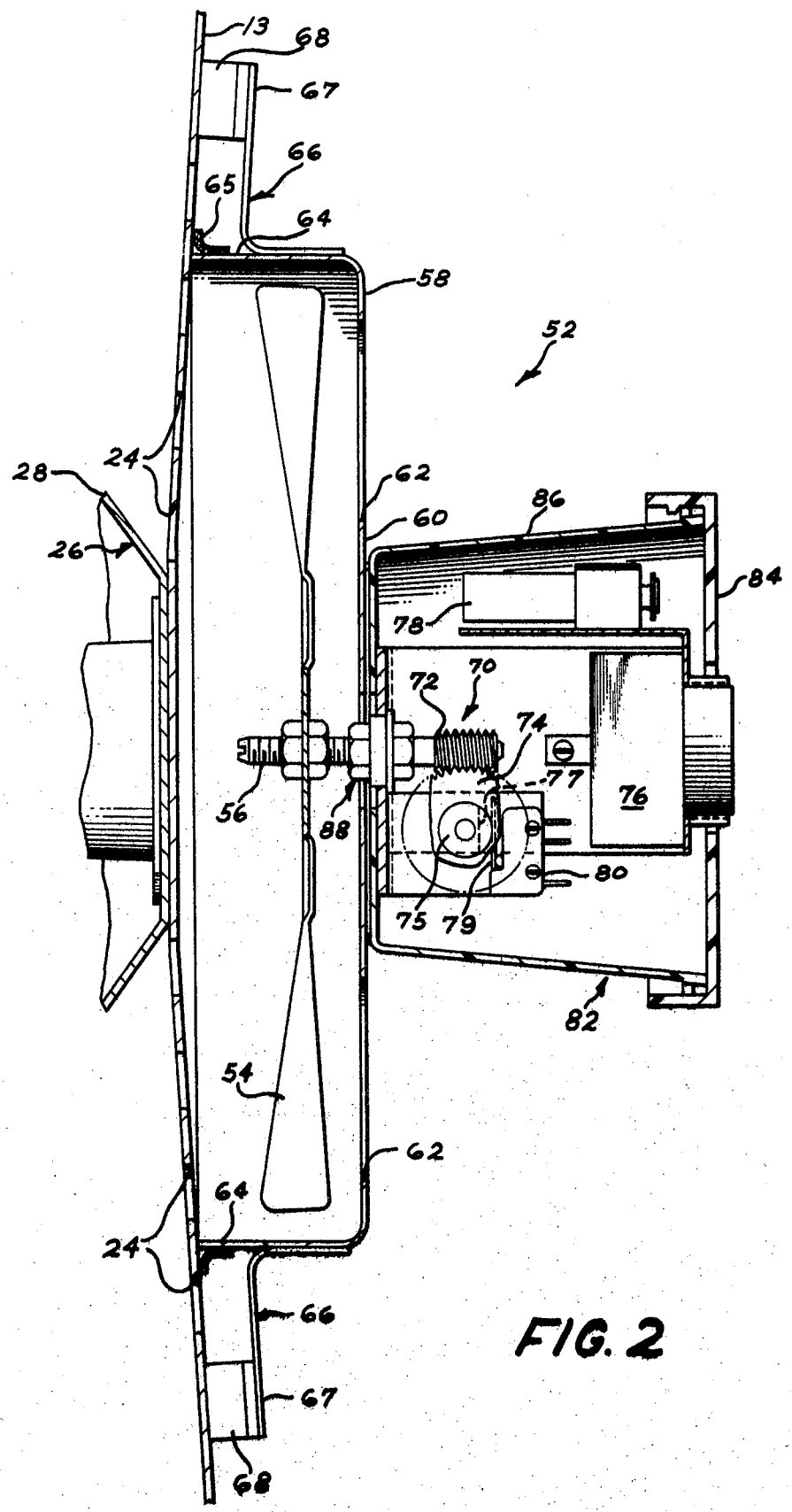
FIG. 2 is an enlarged side elevational view partly in section illustrating various details of the air flow test device of the present invention.
Figure 3:
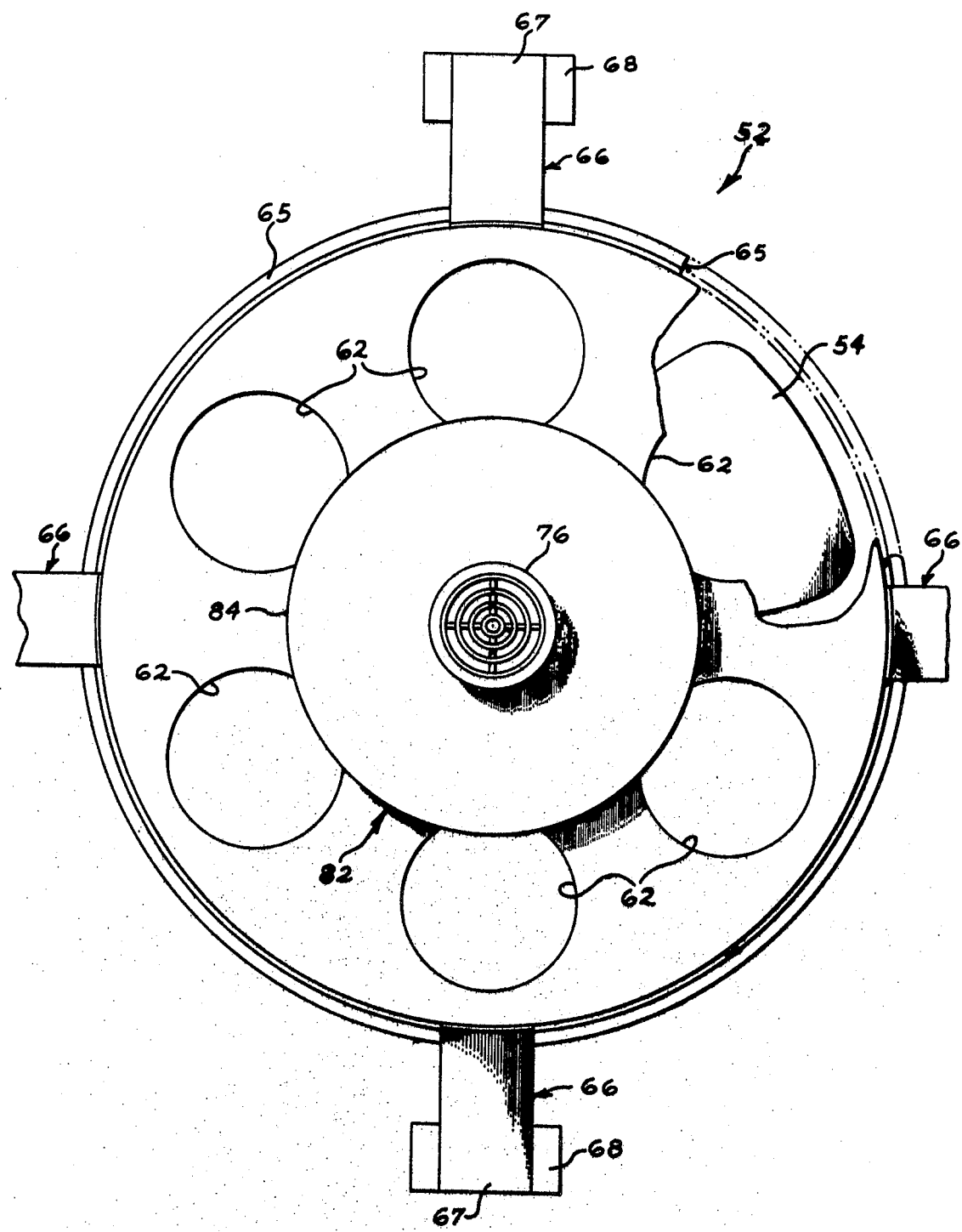
FIG. 3 is a top plan view showing the air flow test device of the present invention.

With reference particularly to FIGS. 2 and 3, the details of the air flow test device 52 will now be described. There is provided a bladed fan 54 secured to a shaft 56. There is a shroud member 58 having a rear wall 60 which is perforated and in the case of the preferred embodiment, consists of a plurality of circular openings 62. The rear wall 60 is circular in shape and has a depending circumferential side wall 64 that surrounds the fan 54. The edge of the circumferential side wall 64 has a resilient gasket 65 that contacts the rear wall 13 of the drum 8. Secured to several locations around the periphery of the depending side wall 64 are flexible support arms 66 which have at their free ends 67 a magnet 68. The purpose of these magnets 68 is to attach themselves to the metal rear wall 13 of the drum 8 for securing the air flow testing device 52 to the rear wall and retain it in its proper position during the operation of the device. The magnets make it quite easy to attach and detach the device 52 from the rear wall 13 of the drum.

There is a counter assembly 70 mounted on the rear wall 60 of the shroud member 58 on the side opposite from the fan. The counter assembly 70 is a mechanism capable of registering the number of revolutions of the fan. Registration of the number of revolutions may be by means of visually displaying the number; it may consist of means for an audible sound being generated when the counter reaches a predetermined number of revolutions, or it may consist of a light functioning similar to that of the audible device. As will be explained in more detail subsequently, the preferred embodiment utilizes an audible registration of the number of fan revolutions. The counter assembly 70 includes an extension of shaft 56 which has the fan secured for rotation in unison therewith at one end and a worm gear 72 secured for rotation therewith at the opposite end. Worm gear 72 meshes with circular gear 74. Formed as part of circular gear 74 is a hub portion 75 that is circular except for a flat area 77. There is a normally open switch 80 having an actuator arm 79 that is biased toward the hub portion 75 and contacts and rides on the hub portion 75. The normally open switch 80 remains open while the actuator arm 79 rides on the circular surface of hub portion 75 but when the flat area 77 reaches the actuator arm 79 it allows the actuator arm 79 to move and close the switch 80. Upon the switch 80 closing an audio device 76 energized by a battery 78 is triggered and an audio signal is generated. Continued rotation of fan 54 in turn causes the hub portion 75 to continue rotation and the actuator arm 79 is moved back to its hub riding position whereupon switch 80 is opened and the audio signal terminated.

Surrounding and enclosing the counter assembly 70 is a housing 82 which has a cover 84 secured to the cup shaped side wall 86 such as by screw threads. The detachable cover 84 is provided so that the battery 78 may be replaced when need be or other inspections may be made of the counter assembly 70. The fan 54, the counter assembly 70, and the housing 82 are all mounted on the rear wall 60 of the shroud 58 by an appropriate bearing and nut assembly 88 to retain them in their proper position.

The method of using the air flow testing device 52 is as follows. While the clothes dryer 1 is inoperative the front door 3 is opened and the air flow test device 52 is placed in the drum by positioning it in the center of the rear wall 13 with the magnets 68 retaining the device in its proper position. The device is placed over at least some of the perforations 24 in the rear wall 13 of the drum. The door 3 is then closed and the clothes dryer machine is put into operation. As a result, the drum 8 carrying the device 52 will be rotated and the flow of heated air will proceed through the holes or perforations 24 in the rear wall 13 of the drum into the shroud member 58 through the blades of the fan 54 and the holes or perforations 62 in the rear wall 60 of the shroud 58. This flow of air will cause the fan 54 to be rotated and the speed of rotation will depend upon the velocity or rate of the air flow from the perforations 24 in the rear wall 13 through the air flow test device 52. The rotation of the fan 54 causes the shaft 56 to be rotated in unison and that shaft in turn rotates worm gear 72 which is meshed with circular gear 74. The counter assembly 70 is arranged to register a predetermmined number of revolutions. When the predetermined number of revolutions is reached the flat area of 77 of hub portion 75 causes switch 80 to be closed which triggers the audio device 76 whereupon a signal is given which maybe heard from outside the clothes dryer. The person conducting the air flow test can determine the amount of time it takes from one audio signal to another and that time period can be compared to a performance chart to determine whether or not the rate of air flow is considered adequate for the clothes dryer machine on which the air flow test device 52 is installed. After the air flow test is complete the front door 3 of the clothes dryer is opened and the air flow test device 52 is detached from the rear wall 13 and removed from within the drum 8.

By this air flow test method and device the person conducting the tests can determine whether or not the air flow rate is adequate or if there is some blockage or leakage that is disrupting the air flow characteristics and therefore the efficiency of the clothes dryer. Moreover, with this test device and method the clothes dryer machine may be operated under its normal conditions and the audio signal can be heard outside the machine so that its operation does not need to be stopped to determine the registration of the number of revolutions of the fan 54.

The foregoing is a description of the preferred embodiment of the invention. In accordance with the patent statutes, changes may be made in the disclosed device and the method in which it is employed without actually departing from the true spirit and scope of the invention as defined in the appended claims.

What is claimed is:

1. A device for checking the adequacy of the rate of air flow in a rotating clothes dryer drum having air flow through perforations in the rear wall of the drum comprising:
   (a) a rotatable fan,
   (b) a counter assembly arranged and including means to register the number of revolutions of the fan,
   (c) means to removably attach the device to the rear wall of the drum over at least some of the perforations in the rear drum wall,
   (d) a circular shroud member having a perforated rear wall and a depending circumferential wall around the fan, and
   (e) a resilient gasket attached to the depending wall of the shroud member to act as a seal between the shroud member and rear wall of the drum.

2. The device of claim 1 wherein the counter assembly is mounted on the rear wall of the shroud on the side opposite from the fan.

3. The device of claim 1 wherein the means to removably attach the device to the rear wall of the drum are magnets.

4. The device of claim 3 wherein the magnets are secured to resilient arms which are attached to the depending circumferential wall of the shroud.

5. The device of claim 1 wherein the means to register a number of revolutions of the fan includes a shaft secured to the fan and rotatable in unison therewith, a worm gear secured to the shaft a circular gear meshing with said worm gear, means responsive to the rotation of said circular gear to signal when a predetermined number of fan revolutions is reached.

6. The device of claim 5 wherein the signal means is an audio device.

7. The device of claim 6 wherein the audio means is electrically energized by a battery.

8. A method of checking the adequacy of the rate of air flow in a rotating clothes dryer drum having air flow through perforations in the rear wall of the drum comprising:
   providing a device including a rotatable fan and a counter assembly that registers the number of revolutions of the fan,
   removably attaching the device to the inside of the rear wall of the drum to cover at least some of the perforations,
   turning on the clothes dryer to rotate the drum and flow air through the rear wall of the drum,
   determining the number of fan revolutions for a period of time, and
   comparing the number of revolutions to a number determined previously to be an adequate air flow rate.

9. The method of claim 8 wherein attaching the device to the inside of the rear wall of the drum is accomplished by magnets attached to the device.

10. The method of claim 8 wherein a shroud is around the fan and the air flow passes through the shroud.

11. The method of claim 8 wherein registering the number of fan revolutions includes an audible signal being given upon reaching a predetermined number of fan revolutions and the time period determined and compared to a predetermined satisfactory air flow rate.

* * * * *